3,424,800
PRODUCTION OF DITHIOLS FROM AZIRIDINES
Clarence R. Bresson and James S. Dix, Bartlesville, Okla., assignors to Phillips Petroleum Company, a corporation of Delaware
No Drawing. Continuation-in-part of application Ser. No. 419,548, Dec. 18, 1964. This application June 3, 1966, Ser. No. 554,977
U.S. Cl. 260—609      3 Claims
Int. Cl. C07c *149/06, 149/12*

This application is a continuation-in-part of our previously filed application Ser. No. 419,548, filed Dec. 18, 1964, now abandoned.

This invention relates to the production of polythiols and mercapto thioethers. In one of its aspects it relates to the production of mercapto thioethers by reacting a mercapto amine with an ammonium mercaptide. In another of its aspects the invention relates to the production of polythiols from aziridine compounds. In a still further aspect, the invention relates to production of a novel compound, 1-(propylthio)-2-propanethiol.

It is well known that polythiols can be prepared by displacement of halogen from the corresponding polyhalides through reaction with alkali metal or ammonium hydrosulfides. For example, this reaction has been utilized in the synthesis of 1,2-ethanedithiol and 1,3-dimercapto-2-propanol from 1,2-dibromoethane and 1,3-dibromo-2-propanol, respectively. It has also been reported that 2,3-dimercaptopropylamine is produced through the action of ammonium hydrosulfide on the hydrochloride of 2,3-dibromopropylamine, the carbon-to-nitrogen bond in the amine remaining intact. It has now been discovered that mercapto thioethers can be produced by replacing an amine group of an amine-substituted organic compound, and that a polythiol can be produced from an aziridine.

It is therefore an object of this invention to produce a polythiol.

It is a further object of this invention to produce a mercapto thioether.

It is a further object of this invention to produce a novel beta-mercapto thioether.

Other aspects, objects, and the several advantages of this invention are apparent to one skilled in the art from a study of this disclosure and the appended claims.

In accordance with our invention, mercapto thioethers are produced by the reaction of a mercaptide having the formula $NH_4SR'$ with a mercapto amine of the formula

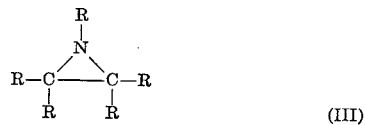

wherein R' is a monovalent hydrocarbon radical selected from the group consisting of alkyl, cycloalkyl, aryl, and combinations thereof such as alkaryl, aralkyl, and the like, each of said hydrocarbon radicals containing preferably 1 to 8 carbon atoms, and R is selected from the group consisting of R' and hydrogen; and preferably wherein the total number of carbon atoms in the amine molecule is 2 to 20.

The products of this aspect of the invention are represented by the formula

wherein R and R' are as defined above.

According to another embodiment of our invention, an aziridine having the formula

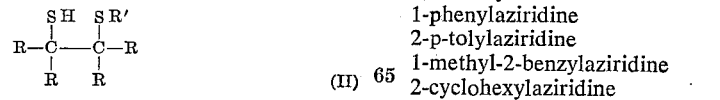

is reacted with a compound selected from the group consisting of ammonium hydrosulfide and ammonium sulfide to give a polythiol having the formula

wherein R in each formula is as defined above, and preferably wherein the total number of carbon atoms in the aziridine molecule is 2 to 20.

Still further according to the invention a novel compound, 1-(propylthio)-2-propanethiol, is produced by reacting a beta-aminopropanethiol with an ammonium mercaptide.

The polythiols and mercapto thioethers have utility as organic intermediates and are particularly useful in the production of polymers or polymer additives. The dithiol products of this invention are useful as antidotes and prophylactics against the lethal action of trivalent arsenical compounds on living sells as set forth in U.S. 2,432,797.

Examples of some amino compounds which can be converted to mercapto thioethers by the method of this invention are 2-mercaptoethylamine
2-mercaptopropylamine
2-amino-1-propanethiol
1-cyclohexyl-2-mercapto-4-phenylbutylamine
N-methyl-2-mercaptobutylamine
N,N-dimethyl-1-ethyl-2-mercaptopropylamine
N,N,1,1,2,4-hexamethyl-2-mercaptopentylamine
N-ethyl-1-butyl-2-mercapto-3,4-dimethylpentylamine
1-octyl-1,2-dimethyl-2-mercaptodecylamine
N-phenyl-2-mercaptopentylamine
N-cyclohexyl-1-benzyl-2-mercaptopropylamine
1-m-tolyl-2-mercapto-3-(3-methylcyclopentyl) propylamine
1-isobutyl-2-mercaptopentylamine
2-mercapto-3-methyl-4-cyclopentylbutylamine
N-octyl-2-mercapto-3-phenylbutylamine
1,2-dicyclohexyl-2-mercaptoethylamine
1-phenyl-2-mercaptobutylamine
2-mercapto-3-o-tolylpropylamine.

Examples of some aziridines which can be converted to polythiols by the process of this invention include aziridine (ethylenimine)
2-methylaziridine (propylenimine)
1-methylaziridine
1,2,3-trimethylaziridine
1-ethyl-2-isopropylaziridine
1-isobutyl-2-propylaziridine
1,2-dioctylaziridine
1,2,3-trihexylaziridine
2,2-diethylaziridine
1-phenylaziridine
2-p-tolylaziridine
1-methyl-2-benzylaziridine
2-cyclohexylaziridine
1-(3-methylcyclopentyl)aziridine 2-(cyclopentylmethyl)aziridine
1-cyclohexyl-2-(3-methylpentyl)aziridine.

The amino compounds which are converted to the mercapto thioethers can be employed as the free base, or they can be employed as a salt of an organic or inorganic acid. Examples of such salts include hydrochlorides, hydrobromides, hydriodides, sulfates, phosphates, acetates, benzoates, picrates, salicylates, and the like.

Examples of some ammonium mercaptides which are reacted with the amines or their salts to produce the mercapto thioethers are the ammonium salts of methanethiol
ethanethiol
1-propanethiol
2-propanethiol
1-butanethiol
2-methyl-1-propanethiol
3-hexanethiol
1-octanethiol
cyclohexanethiol
3-methylcyclopentanethiol
cyclohexanemethanethiol
benzenethiol
p-toluenethiol
2-phenylethanethiol.

As an example of a reaction which can be carried out by the method of this invention, ethylenimine (aziridine) reacts with ammonium hydrosulfide or with ammonium sulfide to produce 1,2-ethanedithiol. As another example, 2-mercaptopropylamine reacts with the ammonium salt of 1-propanethiol to give 1-(propylthio)-2-propanethiol.

In order to obtain a good yield of mercapto thioether, the mole ratio of ammonium mercaptide to mercapto amine preferably is within the range of 1:1 to 20:1, more preferably 4:1 to 10:1. In the production of polythiols by the reaction of aziridine compounds with ammonium hydrosulfide or ammonium sulfide, the mole ratio of ammonium hydrosulfide or ammonium sulfide to aziridine compound preferably is within the range of of 2:1 to 21:1, more preferably 5:1 to 11:1. The ammonium mercaptide can be produced in the reaction vessel containing the mercapto amine, or it can be produced in a separate vessel and then added to the mercapto amine. Similarly, ammonium hydrosulfide or ammonium sulfide can be produced in the reaction vessel containing the aziridine compound, or it can be produced in a separate vessel and then added to the aziridine compound. The reaction time can be one minute to one week, preferably 5 minutes to 2 days, depending on the ease with which the reaction occurs, and the temperature employed. The desired reaction temperature also depends on the nature of the reactants, but will usually be in the range of −50 to 200° C., preferably 0 to 150° C. Solvents which can be used include those which are known to be effective in displacement reactions. Some examples of such solvents are water, alcohols, ammonia, amines, dimethyl sulfoxide, N,N-dimethylformamide, N-methylpyrrolidone, tetrahydrofuran, tetrahydrothiophene - 1,1 - dioxide, and acetonitrile. Water is the solvent preferred. The reaction pressure need be only that required to maintain a substantial amount of the reactants in the liquid phase.

The following examples further illustrate the invention.

EXAMPLE I

To a 1400 ml. stainless steel bomb flushed with nitrogen were added 300 ml. of concentrated ammonium hydroxide (containing approximately 4.6 mols of ammonia), 300 ml. of water, and 22.3 grams (0.52 mol) of ethylenimine, after which 189 grams (5.5 mols) of hydrogen sulfide was added to the bomb cooled in a Dry Ice-acetone bath. The mixture was then heated over a period of 75 minutes to 125° C., at which temperature it was maintained for 16¼ hours on a rocking platform. The reaction mixture was cooled and extracted with 350 ml. of ether. After removal of the ether, the product was distilled to give 18.4 grams (38 percent) of 1,2-ethanedithiol, boiling point 140–143° C., $n_D^{19}$ 1.5571.

EXAMPLE II

To a 1400 ml. stainless steel bomb flushed with nitrogen were added 300 ml. of concentrated ammonium hydroxide (containing approximately 4.6 mols of ammonia), 300 ml. of water, and 28.7 grams (0.50 mol) of propylenimine (2-methylaziridine), after which 187 grams (5.5 mols) of hydrogen sulfide was added to the bomb cooled in a Dry Ice-acetone bath. The mixture was then heated over a period of 100 minutes to 125° C., at which temperature it was maintained for 16½ hours on a rocking platform. The cooled reaction mixture was extracted with 350 ml. of ether. After removal of the ether, the product was distilled to give 23 grams (42 percent) of 1,2-propanedithiol, boiling point 149–151° C., $n_D^{20}$ 1.5312.

EXAMPLE III

To a 1400 ml. stainless steel bomb flushed with nitrogen were added 50.7 grams (0.56 mol) of 2-mercaptopropylamine, 300 ml. of concentrated ammonium hydroxide (containing approximately 4.6 mols of ammonia), 300 ml. of water, and 380 grams (5.0 mols) of 1-propanethiol. The mixture was heated at 90° C. for 17¼ hours on a rocking platform. The reaction mixture was then cooled, and the upper, organic phase was separated. The aqueous phase was extracted with a total of 450 ml. of ether, and the ether extracts were added to the organic phase previously separated. After removal of the ether and unreacted 1-propanethiol, the product was distilled to give 31.3 grams of crude 1-(propylthio)-2-propanethiol containing 25.2 grams of one component, as determined by gas chromatographic analysis, representing a 30 percent yield of the desired product. This crude material was redistilled, giving a center fraction boiling at 58–60° C./2.0 mm., $n_D^{20}$ 1.5079. Gas chromatographic analysis of this fraction indicated more than 95 percent of it to be a single component. The fraction was identified as 1-(propylthio)-2-propanethiol, a new compound, by elemental analysis and —SH determination (by mercuric perchlorate procedure)

Calculated for $C_6H_{14}S_2$: C, 4.79; H, 9.4; S, 42.7; —SH, 21.3. Found: C, 47.5; H, 9.0; S, 42.2; —SH, 18.0.

The 1-(propylthio)-2-propanethiol has a monomercaptan group which permits the compound to function as a monomercaptan. Thus, the compound can be used as an intermediate, a leak detector, an antioxidant or an inhibitor.

EXAMPLE IV

To a 1400 ml. stainless steel bomb flushed with nitrogen were added 11.1 grams (0.12 mol) of 2-amino-1-propanethiol, 150 ml. of concentrated ammonium hydroxide (containing approximately 2.3 mols of ammonia), 150 ml. of water, and 200 ml. (2.2 mols) of 1-propanethiol. The mixture was heated at 125° C. for 41 hours on a rocking platform. The reaction mixture was then cooled, and the upper, organic phase was separated. The aqueous phase was extracted with a total of 350 ml. of ether, and the ether extracts were combined with the organic phase previously separated. After removal of the ether and unreacted 1-propanethiol, the product was distilled to give 4.6 grams of crude material containing 3.4 grams of a single component, as determined by gas chromatographic analysis. It was also shown by gas chromatography that this component was identical to the product identified in Example III. The 3.4 grams of this component represented a 19 percent yield of 1-(propylthio)-2-propanethiol.

Reasonable variation and modification are possible within the scope of the foregoing disclosure and the claims to the invention, the essence of which is that a mercapto thioether is produced by reacting an ammonium mercaptide containing 1 to 8 carbon atoms with a beta-mercapto amine, and a polythiol is produced by reacting at least one of ammonium sulfide and ammonium hydrosulfide with an aziridine; furthermore, a novel compound, 1-(propylthio)-2-propanethiol, is produced.

We claim:

1. A process for the production of polythiol having the formula

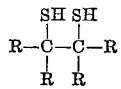

comprising reacting an aziridine having the formula

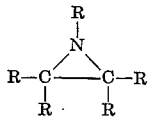

which at least one compound selected from the group consisting of ammonium hydrosulfide and ammonium sulfide, wherein R is selected from the group consisting of hydrogen and a monovalent hydrocarbon radical selected from the group consisting of alkyl, cycloalkyl, aryl, alkaryl, and aralkyl, each of said hydrocarbon radicals containing preferably 1 to 8 carbon atoms; and wherein the total number of carbon atoms in the aziridine molecule is 2 to 20; wherein the molar ratio of sulfide to aziridine is in the range of 2:1 to 21:1.

2. A process according to claim 1 wherein said polythiol is 1,2-ethanedithiol and said aziridine is ethylenimine.

3. A process according to claim 1 wherein said polythiol is 1,2-propanedithiol and said aziridine is propylenimine.

References Cited

UNITED STATES PATENTS 2,432,797   12/1947   Peters et al. _____ 260—609 XR

CHARLES B. PARKER, *Primary Examiner.*

D. R. PHILLIPS, *Assistant Examiner.*

U.S. Cl. X.R.

167—65

UNITED STATES PATENT OFFICE
CERTIFICATE OF CORRECTION

Patent No. 3,424,800 January 28, 1969

Clarence R. Bresson et al.

It is certified that error appears in the above identified patent and that said Letters Patent are hereby corrected as shown below:

Column 5, line 19, "which" should read -- with --. Column 6, line 3, "and-" should read -- and --.

Signed and sealed this 7th day of April 1970.

(SEAL)
Attest:

Edward M. Fletcher, Jr.                WILLIAM E. SCHUYLER, JR.
Attesting Officer                      Commissioner of Patents